(12) United States Patent
Wang et al.

(10) Patent No.: US 9,303,342 B2
(45) Date of Patent: Apr. 5, 2016

(54) COMPOSITE FIBER HAVING ELASTOMER AND METHOD FOR MAKING THE SAME, AND A SUBSTRATE HAVING THE COMPOSITE FIBER AND METHOD FOR MAKING THE SAME

(71) Applicant: San Fang Chemical Industry Co., Ltd., Kaohsiung (TW)

(72) Inventors: Lung-Chuan Wang, Kaohsiung (TW); Chung-Chih Feng, Kaohsiung (TW); Chih-Yi Lin, Kaohsiung (TW); Szu-Wei Huang, Kaohsiung (TW); Kao-Lung Yang, Kaohsiung (TW); Jui-Peng Tung, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 380 days.

(21) Appl. No.: 13/921,560

(22) Filed: Jun. 19, 2013

(65) Prior Publication Data

US 2013/0280977 A1    Oct. 24, 2013

Related U.S. Application Data

(62) Division of application No. 12/948,038, filed on Nov. 17, 2010, now abandoned.

(30) Foreign Application Priority Data

Dec. 31, 2009   (TW) ................................ 98146104 A

(51) Int. Cl.
*D04H 1/485*   (2012.01)
*D04H 1/49*    (2012.01)
(Continued)

(52) U.S. Cl.
CPC .. *D04H 5/06* (2013.01); *B32B 5/08* (2013.01); *B32B 5/26* (2013.01); *B32B 27/02* (2013.01);
(Continued)

(58) Field of Classification Search
CPC ............... D01F 8/04; D01F 8/06; D01F 8/10; D01F 8/12; D01F 8/14; D01F 8/16; D04H 1/485; D04H 1/49; D04H 1/498; D04H 1/541; 04H 1/552; D04H 1/559; D04H 3/105; D04H 3/11; D04H 3/147; D06N 3/0025; D06N 3/0027; B32B 5/06; B32B 5/08; B32B 5/26; Y10T 42/2929; Y10T 442/602
See application file for complete search history.

(56) References Cited

U.S. PATENT DOCUMENTS 6,677,038 B1 * 1/2004 Topolkaraev ............. D01F 8/06
                                                          428/370
6,994,763 B2 * 2/2006 Austin ....................... D01F 8/06
                                                          156/181

(Continued)

FOREIGN PATENT DOCUMENTS

JP    04126814 A    4/1992
JP    04316608 A    11/1992

OTHER PUBLICATIONS

English translation of JP04316608A and JP04126814A.

*Primary Examiner* — Michael Tolin
(74) *Attorney, Agent, or Firm* — WPAT, P.C.; Anthony King

(57) ABSTRACT

A composite fiber having elastomer and method for making the same, and a substrate having the composite fiber and method for making the same are provided. The composite fiber includes a first composition and a second composition. The first composition is thermoplastic non-elastomer, and the second composition is thermoplastic elastomer (TPE). The second composition is in an amount of 5 to 70 weight % of the composite fiber. The first composition and the second composition are alternately distributed in a circumference of a cross-section of the composite fiber, and the length of the second composition is less than 50% of the total length of the circumference. The TPE can be dispersed uniformly and increase the adhesion between fibers, and the segmented fiber cross-section thereof further prevents the TPE from becoming too adhesive and affecting the processing during the fabrication of fibers and non-woven fabric substrates. Therefore, the non-woven fabric substrate or artificial leather made from the composite fiber has excellent textile feeling and physical properties.

4 Claims, 2 Drawing Sheets

(51) Int. Cl.

| | | |
|---|---|---|
| *D04H 1/541* | (2012.01) | |
| *D04H 3/105* | (2012.01) | |
| *D04H 3/11* | (2012.01) | |
| *D04H 3/147* | (2012.01) | |
| *B32B 5/08* | (2006.01) | |
| *B32B 5/26* | (2006.01) | |
| *D04H 5/06* | (2006.01) | |
| *D04H 1/498* | (2012.01) | |
| *D04H 1/552* | (2012.01) | |
| *D06N 3/00* | (2006.01) | |
| *B32B 27/02* | (2006.01) | |
| *B32B 27/12* | (2006.01) | |
| *B32B 27/28* | (2006.01) | |
| *B32B 27/32* | (2006.01) | |
| *B32B 27/36* | (2006.01) | |
| *B32B 27/40* | (2006.01) | |
| *D01F 8/04* | (2006.01) | |
| *D01F 8/06* | (2006.01) | |
| *D01F 8/14* | (2006.01) | |
| *B32B 37/14* | (2006.01) | |

(52) U.S. Cl.
CPC .............. *B32B 27/12* (2013.01); *B32B 27/28* (2013.01); *B32B 27/32* (2013.01); *B32B 27/36* (2013.01); *B32B 27/40* (2013.01); *B32B 37/14* (2013.01); *D01F 8/04* (2013.01); *D01F 8/06* (2013.01); *D01F 8/14* (2013.01); *D04H 1/485* (2013.01); *D04H 1/49* (2013.01); *D04H 1/498* (2013.01); *D04H 1/541* (2013.01); *D04H 1/552* (2013.01); *D04H 3/105* (2013.01); *D04H 3/11* (2013.01); *D04H 3/147* (2013.01); *D06N 3/0027* (2013.01); *Y10T 428/24074* (2015.01); *Y10T 428/2929* (2015.01); *Y10T 442/602* (2015.04)

(56) References Cited

U.S. PATENT DOCUMENTS

| | | | | |
|---|---|---|---|---|
| 2005/0084719 | A1* | 4/2005 | Yoshimoto | D06N 3/0004 422/105 |
| 2006/0216506 | A1* | 9/2006 | Xiang | D01F 8/04 428/375 |
| 2008/0003912 | A1* | 1/2008 | Pourdeyhimi | B32B 7/02 442/340 |

* cited by examiner

COMPOSITE FIBER HAVING ELASTOMER AND METHOD FOR MAKING THE SAME, AND A SUBSTRATE HAVING THE COMPOSITE FIBER AND METHOD FOR MAKING THE SAME

BACKGROUND OF THE INVENTION

1. Field of the Invention

The present invention relates to a composite fiber and a method for making the same, and a substrate having the composite fiber and a method for making the same, and more particularly to a composite fiber having elastomer and a method for making the same, and a substrate having the composite fiber and a method for making the same.

2. Description of the Related Art

Artificial leather is generally fabricated with the following method. A non-woven fabric (containing fibers made of non-elastomeric polymer such as nylon or polyester) is doped/impregnated in an elastopolymer solution or a latex solution (mainly containing polyurethane (PU)), and the elastopolymer is then cured through a wet or dry process. The non-woven fabric doped with the elastopolymer is cured into a sponge or a block-shaped structure, in which the cured elastopolymer covers and surrounds fiber bundles.

Natural leather has a substrate constructed with a delicate upper layer and a rough lower layer. However, strict control technology is required in the PU-impregnation stage of the artificial leather, and although the PU-impregnated substrate has excellent texture and durability, the fibers are filled with a resin to form a solid construction, resulting in poor air permeability and difficulty in achieving lightweight performance. Moreover, as a solvent is used in PU-impregnation, the fabrication is complicated, and environmental problems may occur.

Most artificial leather using superfine fiber which needs to undergo fiber distribution by using a solvent or lye. Since the fiber distribution process must be implemented with the solvent or lye, severe pollution to the environment will occur.

Japanese Patent Publication No. H04-185777 discloses a method of fabricating artificial leather by using a high-density non-woven fabric substrate to impregnate with low dry content binder resin before PU-impregnation. However, as the distribution of the impregnated binder from the interior to the exterior of the non-woven fabric can hardly be uniform, the fabricated artificial leather lacks softness on the surface, has low inter-layer strength, and cannot be used as a material for shoes in rigorous conditions.

Japanese Patent Publication No. S54-59499 discloses a method of impregnating a wound non-woven fabric substrate made of fine fiber bundles in an aqueous emulsion of a binder resin, and then blowing hot air on only one side of the substrate, so that the binder resin mainly migrates on the side blown with the hot air, and the migration of the resin on the other side of the substrate is suppressed. However, when the migration is prevented according to this method, as a minute amount of aqueous emulsion of the binder resin is left on the other side, the curing degree varies on the two sides of the substrate, and thus it is difficult to fabricate an artificial leather substrate made of fine fibers with no binder resin adhered to the surface thereof.

Taiwan (ROC) Patent Publication No. 200745408 discloses a method of using a fibrous binder to achieve uniform distribution of the binder. In this method, a water-soluble thermoplastic polyvinyl alcohol (PVA) resin is used as a sea composition polymer of sea-island cross-section fibers, and after a non-woven fabric is made, the PVA resin is uniformly distributed in the non-woven fabric through water-solubility and thermoplasticity of the resin. However, as the PVA resin is inelastic and easily solved in water, the whole fabric lacks softness, and is easily attenuated in physical properties and cannot be used any more in a damp environment.

Taiwan (ROC) Patent No. 134197 discloses a method in which a substrate is formed by a matrix fiber and a binder fiber provided with an elastopolymer on its surface. This method is characterized in that the binder fiber is dispersed in the matrix fiber and softened in a fiber assembly of the matrix fiber. The binder fiber used herein is mainly of a core-sheath configuration. During the formation of a fiber substrate, in order to prevent premature adhesion of the fibers, which would affect the quality of the substrate, a mold releasing agent is applied to a part of the surface of the matrix fiber. In this case, although the impregnation with an elastopolymer solution is not needed, the fabrication time and cost are not effectively reduced due to the additional mold releasing agent process.

Therefore, it is necessary to provide a composite fiber having elastomer and a method for making the same, and a substrate having the composite fiber and a method for making the same to solve the above problems.

SUMMARY OF THE INVENTION

The present invention is directed to a method for making a composite fiber having elastomer. The method includes: (a) providing a first composition and a second composition, in which the first composition is thermoplastic non-elastomer, the second composition is thermoplastic elastomer (TPE), and the second composition is in an amount of 5 to 70 weight % of the composite fiber; and (b) using a composite spinneret to simultaneously spin the first composition and the second composition so as to perform segmented composite spinning to obtain a plurality of composite fibers, in which the first composition and the second composition are alternately distributed in a circumference of a cross-section of each of the composite fibers, and the length of the second composition is less than 50% of the total length of the circumference.

The present invention is also directed to an artificial leather substrate including a plurality of composite fibers. In the substrate, cross-points between the composite fibers are elastic bonding points formed by softening the second composition.

The present invention is further directed to a method for making an artificial leather substrate. The method includes: (a) providing a plurality of composite fibers; (b) forming a plurality of fiber webs, in which the fiber webs contain the composite fibers; (c) stacking the fiber webs; (d) performing needle punching or water punching on the fiber webs; (e) softening the second composition to bond the composite fibers; and (f) curing the second composition, so that cross-points between the composite fibers are elastic bonding points formed by the second composition.

In the present invention, the TPE in the composite fiber can be dispersed uniformly and increase the adhesion between fibers, and the segmented fiber cross-section thereof may further prevent the TPE from becoming too adhesive and thus affecting the processing during the fabrication of fibers and non-woven fabric substrates. Therefore, the surface of the non-woven fabric becomes more delicate and smoother after hot-pressing, and the physical properties of the fabric are enhanced and a high dimensional stability is achieved. Moreover, no additional solvent is needed in the fiber refining of the non-woven fabric substrate, so an environment-friendly fiber opening process with no waste is provided, and the non-woven fabric substrate has textile feeling like superfine fibers and resilient touch similar to natural leather. Thus, the artificial leather made from the composite fiber has excellent textile feeling and physical properties.

DETAILED DESCRIPTION OF THE INVENTION

In the present invention, a first composition (thermoplastic non-elastomer) and a second composition (thermoplastic elastomer, TPE) are used for segmented superfine fiber composite spinning to obtain a composite fiber, and the composite fiber is further processed into an artificial leather substrate and artificial leather. The composite fiber is characterized in that the first composition (thermoplastic non-elastomer) is in an amount of 30 to 95 weight %, preferably 40 to 60 weight %, of the composite fiber. The second composition (TPE) is in an amount of 5 to 70 weight % of the composite fiber. The second composition (TPE) is discontinuously distributed in a circumference of a cross-section of the composite fiber, and alternately distributed with the first composition (thermoplastic non-elastomer). Moreover, the length of the second composition (TPE) is less than 50% of the total length of the circumference along the cross-section of the composite fiber.

The composite fiber has the following advantages. As the second composition (TPE) exposed outside a periphery of the composite fiber is reduced, a mold releasing agent is not needed. Besides, after the composite fiber is softened by heating or through solution impregnation, the second composition (TPE) is separated by the first composition (thermoplastic non-elastomer), so the second composition (TPE) does not become too adhesive or feel like rubber. In addition, after being softened and dispersed by flowing, the first composition (thermoplastic non-elastomer) may achieve the effect of fiber refining.

Figure 1:
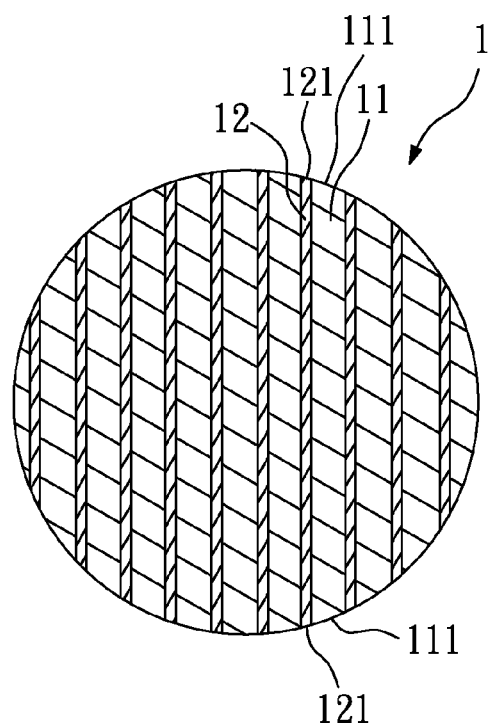
FIG. 1 is a schematic cross-sectional view of a composite fiber having elastomer according to a first embodiment of the present invention.

FIG. 1 shows a schematic cross-sectional view of a composite fiber having elastomer according to a first embodiment of the present invention. The composite fiber 1 includes a first composition 11 and a second composition 12. The first composition 11 is thermoplastic non-elastomer, and the second composition 12 is TPE. The first composition 11 is exposed outside a periphery of the composite fiber 1, and forms a plurality of first segments 111 in a circumference of a cross-section of the composite fiber 1. The second composition 12 is exposed outside the periphery of the composite fiber 1, and forms a plurality of second segments 121 in the circumference of the cross-section of the composite fiber 1. The first segments 111 and the second segments 121 together form the circumference of the cross-section of the composite fiber 1, and the first segments 111 and the second segments 121 are distributed alternately. The total length of the second segments 121 is less than 50% of the total length of the circumference along the cross-section of the composite fiber.

In this embodiment, the first composition 11 includes a plurality of first stripes having the first segments 111 on two ends, and the second composition 12 includes a plurality of second stripes having the second segments 121 on two ends.

Figure 2:
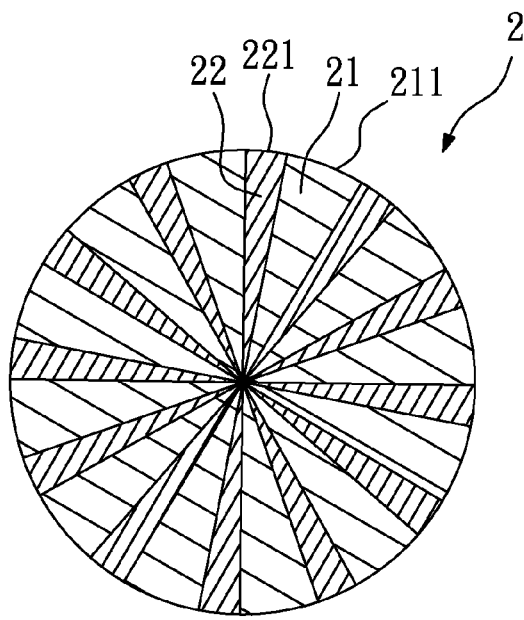
FIG. 2 is a schematic cross-sectional view of a composite fiber having elastomer according to a second embodiment of the present invention.

FIG. 2 shows a schematic cross-sectional view of a composite fiber having elastomer according to a second embodiment of the present invention. The composite fiber 2 includes a first composition 21 and a second composition 22. The first composition 21 is thermoplastic non-elastomer, and the second composition 22 is TPE. The first composition 21 is exposed outside a periphery of the composite fiber 2, and forms a plurality of first segments 211 in a circumference of a cross-section of the composite fiber 2. The second composition 22 is exposed outside the periphery of the composite fiber 2, and forms a plurality of second segments 221 in the circumference of the cross-section of the composite fiber 2. In this embodiment, the first composition 21 includes a plurality of first sectors having the first segments 211 as arc-shaped edges, and the second composition 22 includes a plurality of second sectors having the second segments 221 as arc-shaped edges.

Figure 3:
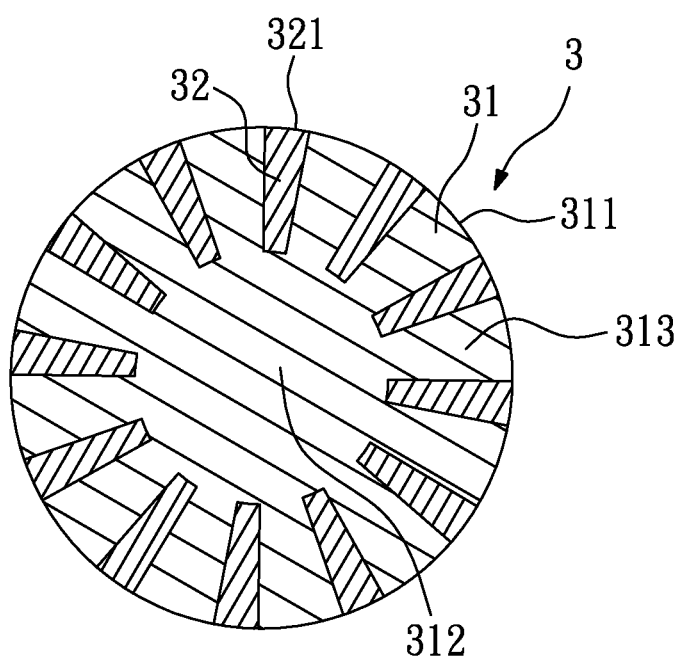
FIG. 3 is a schematic cross-sectional view of a composite fiber having elastomer according to a third embodiment of the present invention.

FIG. 3 shows a schematic cross-sectional view of a composite fiber having elastomer according to a third embodiment of the present invention. The composite fiber 3 includes a first composition 31 and a second composition 32. The first composition 31 is thermoplastic non-elastomer, and the second composition 32 is TPE. The first composition 31 is exposed outside a periphery of the composite fiber 3, and forms a plurality of first segments 311 in a circumference of a cross-section of the composite fiber 3. The second composition 32 is exposed outside the periphery of the composite fiber 3, and forms a plurality of second segments 321 in the circumference of the cross-section of the composite fiber 3. In this embodiment, the first composition 31 includes a central portion 312 and a plurality of first peripheral portions 313. The first peripheral portions 313 extend outwards from the central portion 312 and have the first segments 311 on outer ends. The second composition 32 includes a plurality of second peripheral portions, and each of the second peripheral portions is located between two of the first peripheral portions 313. The second peripheral portions are connected to the central portion 312 on one end, and have the second segments 321 on the other end.

A method for making a composite fiber having elastomer according to the present invention includes the steps of: (a) providing a first composition and a second composition, in which the first composition is thermoplastic non-elastomer, the second composition is thermoplastic elastomer (TPE), and the second composition is in an amount of 5 to 70 weight % of the composite fiber; and (b) using a composite spinneret to simultaneously spin the first composition and the second composition so as to perform segmented composite spinning to obtain a plurality of composite fibers, in which the first composition and the second composition are alternately distributed in a circumference of a cross-section of each of the composite fibers, and the length of the second composition is less than 50% of the total length of the circumference.

Take the composite fiber 2 of the second embodiment for example, in the spinning process of Step (b), the first composition 21 (thermoplastic non-elastomer) and the second composition 22 (TPE) are separately extruded to form a composite fiber 2 having 8 to 128, preferably 16 to 48, sectors in total. If the total number of the sectors is too small, the second composition 22 (TPE) is not well dispersed after being softened by heating or through solution impregnation, and the fabricated artificial leather substrate or artificial leather has undesirable strength or textile feeling. If the total number of the sectors is too large, the second composition 22 (TPE) completely wraps the composite fiber 2 after being softened by heating or through solution impregnation, and the fabricated artificial leather substrate or artificial leather has undesirable textile feeling. Therefore, the length of the second composition 22 (TPE) distributed along the cross-section of the composite fiber 2 is less than 50%, preferably below 40%, of the total length of the circumference. If the percentage is too great, after the second composition 22 (TPE) is softened by heating or through solution impregnation, the composite fibers 2 may become too adhesive, thereby giving the fabricated artificial leather substrate or artificial leather a rather hard textile feeling.

In the present invention, the material of the first composition is selected from the group consisting of polyester polymers, polyamide polymers, and polyolefin polymers. The polyester polymers are polyethylene terephthalate (PET), polybutylene terephthalate (PBT), polytrimethylene terephthalate (PTT), and modifications or copolymers thereof. The polyamide polymers are polyamide-6 (PA6), polyamide-66 (PA66), polyamide-12 (PA12), and modifications or copolymers thereof. The polyolefin polymers are polyethylene (PE), polypropylene (PP), and modifications or copolymers thereof. In addition, functional auxiliary agents such as dyes, carbon black, plasticizers, and stabilizers may be added according to actual requirements.

In the present invention, the material of the second composition is selected from the group consisting of thermoplastic styrenic block copolymer elastomer, thermoplastic polyester elastomer (TPEE), thermoplastic olefin (TPO), thermoplastic vulcanizate (TPV), and thermoplastic polyamide (TPA). The thermoplastic styrenic block copolymer elastomer is styrene-butadiene-styrene (SBS), styrene-ethylene/butylene-styrene (SEBS), styrene-ethylene/propylene-styrene (SEPS), styrene-isoprene-styrene (SIS), or mixtures thereof. The TPO is thermoplastic ethylene-propylene copolymer (TEP). In addition, functional auxiliary agents such as dyes, carbon black, antisticking agents, and stabilizers may be added according to actual requirements.

The present invention further provides an artificial leather substrate, which includes a plurality of composite fibers (as described above). Each of the composite fibers includes a first composition (as described above) and a second composition (as described above). The first composition is thermoplastic non-elastomer, the second composition is TPE, and the second composition is in an amount of 5 to 70 weight % of the composite fiber. The first composition and the second composition are alternately distributed in a circumference of a cross-section of each of the composite fibers, and the length of the second composition is less than 50% of the total length of the circumference. Cross-points between the composite fibers are elastic bonding points formed by softening the second composition.

The material of the first composition is selected from the group consisting of polyester polymers, polyamide polymers, and polyolefin polymers. The material of the second composition is selected from the group consisting of thermoplastic styrenic block copolymer elastomer, TPEE, TPO, TPV, and TPA.

Preferably, the substrate further includes a plurality of mixed fibers. The mixed fibers are thermoplastic non-elastomer, and the material thereof is selected from the group consisting of polyester polymers, polyamide polymers, and polyolefin polymers. The composite fibers are in an amount of 5 to 75 weight % of the substrate.

The composite fibers are formed into a plurality of first fiber webs, the mixed fibers are formed into a plurality of second fiber webs, and the first fiber webs and the second fiber webs are stacked over each other. Alternatively, the mixed fibers are blended to form a plurality of third fiber webs, and the third fiber webs are stacked over one another. Cross-points between the mixed fibers and the composite fibers are elastic bonding points formed by softening the second composition.

A method for making a substrate by using the composite fiber includes the steps of: (a) providing a plurality of composite fibers (as described above), in which each of the composite fibers includes a first composition (as described above) and a second composition (as described above), the first composition is thermoplastic non-elastomer, the second composition is TPE, and the second composition is in an amount of 5 to 70 weight % of the composite fiber, the first composition and the second composition are alternately distributed in a circumference of a cross-section of each of the composite fibers, and the length of the second composition is less than 50% of the total length of the circumference; (b) forming a plurality of fiber webs, in which the fiber webs contain the composite fibers; (c) stacking the fiber webs; (d) performing needle punching or water punching on the fiber webs; (e) softening the second composition by heating or through solution impregnation to bond the composite fibers; and (f) curing the second composition by removing the heat or the solution, so that cross-points between the composite fibers are elastic bonding points formed by the second composition.

If only the composite fibers are provided, the composite fibers are formed into a plurality of first fiber webs in Step (b), the first fiber webs are stacked in Step (c), and needle punching or water punching is performed on the first fiber webs in Step (d).

If a plurality of mixed fibers is further provided in Step (a), the mixed fibers are the thermoplastic non-elastomer, and the composite fibers are in an amount of 5 to 75 weight % of the substrate, the following two circumstances may occur in the subsequent processes.

In a first circumstance, the composite fibers are formed into a plurality of first fiber webs and the mixed fibers are formed into a plurality of second fiber webs in Step (b), the first fiber webs and the second fiber webs are stacked over each other in Step (c), needle punching or water punching is performed on the first fiber webs and the second fiber webs in Step (d), the second composition is softened to bond the composite fibers and the mixed fibers in Step (e), and the second composition is cured, so that cross-points between the mixed fibers and the composite fibers are elastic bonding points formed by softening the second composition in Step (f).

In a second circumstance, the composite fibers and the mixed fibers are blended to form a plurality of third fiber webs in Step (b), the third fiber webs are stacked over one another in Step (c), needle punching or water punching is performed on the third fiber webs in Step (d), the second composition is softened to bond the composite fibers and the mixed fibers in Step (e), and the second composition is cured, so that cross-points between the mixed fibers and the composite fibers are elastic bonding points formed by softening the second composition in Step (f).

A method for making a non-woven fabric substrate is illustrated below in an embodiment. First, the composite fibers are formed into a plurality of fiber webs by spunbond, meltblow, Carding, wet spinning, or airlaid. Undrawn yarn of approximately 3 denier to 30 denier is obtained through the last three processes, and the undrawn yarn is then drawn, heat-set, crimped, oiled, dried, and cut off to form a composite staple fiber with crimps having a fineness of 1 denier to 10 denier and a length of 2 cm to 10 cm. Next, the composite staple fiber is blended at a weight ratio of 5% to 100% with other staple fibers to form a fiber web. Then, a plurality of fiber webs is stacked, and the fiber composition and proportion vary for fiber webs of different layers. Finally, needle punching (or water punching) is performed to generate entanglement between the fibers, so as to form a non-woven fabric having a basis weight of 100 g/m² to 1000 g/m². The non-woven fabric is further hot-pressed at 80° C. to 200° C. to smooth down the surface, and thus can be used as the non-woven fabric substrate for artificial leather.

The staple fiber or filament that is blended with the composite fiber to form the non-woven fabric may include one or more staple fibers or filament. The staple fiber or filament may be a staple fiber formed of a single composition selected from the group consisting of polyester polymers, polyamide polymers, and polyolefin polymers, or a composite staple fiber or composite long fiber formed of at least two of the above compositions.

The present invention further provides an artificial leather, which includes a substrate (as described above) and an elastic film. The substrate is a non-woven fabric substrate. The elastic film is located on a surface of the substrate. The material of the elastic film is elastopolymer or latex.

The artificial leather can be made with the following three methods, but the present invention is not thus limited.

In a first method, an elastopolymer solution or a latex solution is directly and uniformly applied on a release paper. Then, the elastopolymer solution or latex solution is dried and the solvent is removed to form an elastic film. The applying and drying steps may be repeated according to different function or thickness requirements so as to form a multilayer elastic film. Finally, an elastopolymer binding agent is uniformly applied on the surface of the elastic film, and the non-woven fabric substrate is laminated on the film and dried so that the elastic film and the non-woven fabric substrate are fully attached, and the release paper is peeled off to obtain the artificial leather after cooling.

In a second method, an elastopolymer solution or a latex solution is directly and uniformly applied on the non-woven fabric substrate. Then, the solvent is removed and the elastopolymer is solidified. Afterwards, the solvent is cleaned by rinsing and the substrate is dried. At this time, the solidified elastopolymer forms an elastic film. Finally, surface treatment such as abrasion (abrading the elastic film) and lamination (laminating the non-woven fabric substrate and the elastic film on another PU) is performed according to different requirements to obtain the artificial leather.

In a third method, the non-woven fabric substrate is impregnated (dipping) in an elastopolymer solution or a latex solution, and the elastopolymer solution or latex solution is infiltrated into the interior of the non-woven fabric substrate. Roller extrusion is then performed to maintain the absorbed elastopolymer solution or latex solution at a desired ratio. The substrate is slightly dried to remove the solvent, and the elastopolymer solution or latex solution is further applied on the surface of the substrate. Afterwards, the solvent is removed and the elastopolymer is solidified. Then, the solvent is cleaned by rinsing and the substrate is dried. At this time, the solidified elastopolymer forms an elastic film. Finally, surface treatment such as abrasion (abrading the elastic film) and lamination (laminating the non-woven fabric substrate and the elastic film on another PU) is performed according to different requirements to obtain the artificial leather.

The material of the elastopolymer may be synthetic resin selected from the group consisting of polyvinyl chloride, polyamide, polyester, polyester-polyether copolymer, polyacrylate copolymer, PU, polychloroprene, styrene-butadiene copolymer, silicone, polyamino acid, and polyamino acid-polyurethane copolymer, or natural polymer resin, or any mixture thereof. In addition, functional auxiliary agents such as pigments, dyes, crosslinkers, fillers, plasticizers, and stabilizers may be added according to actual requirements.

The present invention has the following advantages. The TPE in the composite fiber can be dispersed uniformly and increase the adhesion between fibers, and the segmented fiber cross-section thereof may further prevent the TPE from becoming much more adhesive and affecting the processing during the fabrication of fibers and non-woven fabric substrates. Therefore, the surface of the non-woven fabric becomes more delicate and smoother after hot-pressing, and the physical properties of the fabric are enhanced and a high dimensional stability is achieved. Moreover, no additional solvent is needed in the fiber refining of the non-woven fabric substrate, so that an environment-friendly fiber opening process with no waste is provided, and the non-woven fabric substrate has textile feeling like superfine fibers and resilient touch close to that of natural leather. Thus, the artificial leather made from the composite fiber has excellent textile feeling and physical properties.

After being softened by heating or through solution impregnation, the TPE has low fluidity, and is thus capable of flowing and being dispersed between the fibers. Afterwards, when the heat or solution is removed, the TPE returns to a solid state, thereby increasing the adhesion between the fibers. In this case, in addition to the physical entanglement, the adhesion caused by the TPE is also provided between the fibers. Thus, the strength of the artificial leather substrate and the artificial leather is enhanced, the elongation of the leather in the machine direction (MD) and cross direction (CD) is reduced, and the dimensional stability of the material is improved. In the artificial leather substrate fabricated by using this method, the TPE is dispersed inside the substrate, so the substrate achieves the elastic touch of artificial leather, and marks left after needle punching or water punching are reduced so that the surface becomes more delicate and smoother. Therefore, when an elastopolymer solution or a latex solution is further applied on the substrate, the number of times of application and the amount of the solution are reduced, so the manufacturing time and cost of the substrate are also decreased.

In the present invention, during the thermal treatment or solution impregnation of the artificial leather substrate or artificial leather, the TPE is capable of flowing and being dispersed like the sea composition of the sea-island fiber, and another fiber that is not heated or impregnated in a solution is refined. At this time, the TPE does not need to be removed, but is dispersed between the fibers and serves as a binder between the fibers after being cooled down. Therefore, in the whole fiber refining process, no composition is removed, and treatment after composition removal is unnecessary, so this process is an environment-friendly fiber refining process.

Examples are given below to further illustrate the present invention, and the present invention is not limited to the disclosure of these examples.

EXAMPLE 1

SEBS chips (having a melt flow rate of 25 g/10 min, manufactured by Kraton Polymers Inc.) and PBT chips (having a intrinsic viscosity of 0.94 dl/gr, manufactured by Chang Chun Plastics Co., Ltd.) are used as raw materials in composite spinning for 24 segmented composite spinning, in which the melting temperature of the SEBS is set to 270° C., the melting temperature of the PBT is set to 280° C., and the composite weight ratio of SEBS/PBT is 40/60. Spinning winding is then performed at a rate of 700 m/min to form a 15-denier composite fiber. Afterwards, the fiber is drawn by a multiple of 2.8, heat-setting is performed on the fiber having crimp with crimper machine, finally the fiber is cut into a composite staple fiber at a length of 60 mm by cutting machine. The composite staple fiber has the following physical properties: fineness: 6 denier, fiber strength: 2.1 g/den, and elongation: 80%.

The composite staple fiber is then blended with a polyester staple fiber having a fineness of 2 denier at a weight ratio of 30/70. The fiber is opened, and is processed by a carding machine into a web. The web is stacked for five layers to achieve physical entanglement, thereby forming a non-woven fabric. The non-woven fabric has a weight per unit area of 220 g/m². The non-woven fabric is then hot-pressed at 160° C. to smooth down the surface of the fabric, and the SEBS is melted and softened at the same time. During the hot-pressing and cooling process, because the segmented structure of the composite fiber which will be fine-cut and adhesion at some parts is generated between the fibers, so as to obtain an artificial leather substrate. As the TPE is dispersed and adhered between the fibers, the artificial leather substrate achieves desirable performance, and has the textile feeling of artificial leather when rubbed by hands.

COMPARATIVE EXAMPLE 1

A 100% polyester staple fiber is opened, and is processed by a carding machine into a web. Under conditions similar to those in Example 1, the web is sequentially cogged and finished to achieve physical entanglement, thereby forming a non-woven fabric. The non-woven fabric has a weight per unit area of 220 g/m². The non-woven fabric is then hot-pressed at 190° C. to smooth down the surface of the fabric.

Table 1 shows a comparison of the physical properties of the substrate of Comparative Example 1 (100% polyester staple fiber) and the substrate of Example 1 (30% SEBS composite staple fiber+70% polyester staple fiber). As shown in Table 1, the performance of the substrate having the SEBS/PBT composite staple fiber is significantly enhanced in terms of tear strength, tensile strength, peeling strength, and rupture strength, and the drop of elongation may improve the dimensional stability of the substrate in processing.

TABLE 1

Comparison of the physical properties of the substrate of Comparative Example 1 (100% polyester staple fiber) and the substrate of Example 1 (30% SEBS composite staple fiber + 70% polyester staple fiber), in which MD represents mechanical direction and CD represents cross direction.

| Fiber composition of non-woven fabric substrate | | Tear strength (kg) | Tensile strength (kg) | Elongation (%) | Peeling strength (kg) | Rupture strength (kg) |
| --- | --- | --- | --- | --- | --- | --- |
| 100% polyester staple fiber | MD | 8.5 | 24 | 80 | 12 | 15 |
| | CD | 7.0 | 26 | 90 | | |
| 30% SEBS composite staple fiber + 70% polyester staple fiber | MD | 10 | 32 | 65 | 17 | 20 |
| | CD | 8 | 29 | 76 | | |

EXAMPLE 2

TPEE chips (having a hardness of 72 D, manufactured by LG Chem Co., Ltd.) and PET chips (having a intrinsic viscosity of 0.94 dl/gr, manufactured by Shinkong Synthetic Fibers Corporation) are used as raw materials in composite spinning for 24 segmented composite spinning, in which the melting temperature of the TPEE is set to 275° C., the melting temperature of the PET is set to 280° C., and the composite weight ratio of TPEE/PET is 40/60. Spinning winding is then performed at a rate of 700 m/min to form a 10-denier composite fiber. Afterwards, the fiber is drawn by a multiple of 2.5, heat-setting is performed on the fiber having crimp with crimper machine, finally the fiber is cut into a composite staple fiber at a length of 60 mm by cutting machine. The composite staple fiber has the following physical properties: fineness: 4 denier, fiber strength: 2.5 g/den, and elongation: 50%.

The composite staple fiber is then blended with a polyester staple fiber at a weight ratio of 30/70. The fiber is opened, and is processed by a carding machine into a web. The web is stacked for five layers, and sequentially cogged and finished to achieve physical entanglement, thereby forming a non-woven fabric. The non-woven fabric is then hot-pressed at 180° C. to smooth down the surface of the fabric, and the TPEE is melted and softened at the same time. During the hot-pressing and cooling process, because the segmented structure of the composite fiber which will be fine-cut and adhesion at some parts is generated between the fibers, so as to obtain an artificial leather substrate. As the TPE is dispersed and adhered between the fibers, the artificial leather substrate achieves desirable performance, and has the textile feeling of artificial leather when rubbed by hands.

EXAMPLE 3

SEBS chips (having a melt flow rate of 25 g/10 min, manufactured by Kraton Polymers Inc.) and PET chips (having a intrinsic viscosity of 0.64 dl/gr, manufactured by Shinkong Synthetic Fibers Corporation) are used as raw materials in composite spinning for 24 segmented composite spinning, in which the melting temperature of the SEBS is set to 270° C., the melting temperature of the PET is set to 285° C., and the composite weight ratio of SEBS/PET is 45/55. Spinning winding is then performed at a rate of 800 m/min to form a 13-denier composite fiber. Afterwards, the fiber is drawn by a multiple of 3.1, heat-setting is performed on the fiber having crimp with crimper machine, finally the fiber is cut into a composite staple fiber at a length of 60 mm by cutting machine. The composite staple fiber has the following physical properties: fineness: 4.5 denier, fiber strength: 2.0 g/den, and elongation: 60%.

The composite staple fiber is then blended with a PET staple fiber having a fineness of 2 denier at a weight ratio of 35/65. The fiber is opened, and is processed by a carding machine into a web. The web is stacked for five layers, and sequentially cogged and finished to achieve physical entanglement, thereby forming a non-woven fabric. The non-woven fabric has a weight per unit area of 220 g/m². The non-woven fabric is then hot-pressed at 160° C. to smooth down the surface of the fabric, and the SEBS is melted and softened at the same time. During the hot-pressing and cooling process, because the segmented structure of the composite fiber which will be fine-cut and adhesion at some parts is generated between the fibers, so as to obtain an artificial leather substrate.

EXAMPLE 4

TEP chips (having a melt flow rate of 50 g/10 min, manufactured by Vistamaxx Company) and PET chips (having a intrinsic viscosity of 0.64 dl/gr, manufactured by Shinkong Synthetic Fibers Corporation) are used as raw materials in composite spinning for 32 segmented composite spinning, in which the melting temperature of the TEP is set to 270° C., the melting temperature of the PET is set to 290° C., and the composite weight ratio of TEP/PET is 35/65. The obtained composite fiber is drawn by a drawing machine at a rate of 5000 m/min, and the drawn composite fiber has the following physical properties: fineness: 3 denier, fiber strength: 5.0 g/den, and elongation: 45%. After being drawn by the drawing machine, the composite fiber is spread into a fiber web with uniform mass distribution. The fiber web is stacked for seven layers, and sequentially cogged and finished to achieve physical entanglement, thereby forming a non-woven fabric. The non-woven fabric has a weight per unit area of 330 g/m². The non-woven fabric is then hot-pressed at 160° C. to smooth down the surface of the fabric, and the TEP is melted and softened at the same time. During the hot-pressing and cooling process, because the segmented structure of the composite fiber which will be fine-cut and adhesion at some parts is generated between the fibers, so as to obtain an artificial leather substrate.

EXAMPLE 5

TPEE chips (having a hardness of 72 D, manufactured by LG Chem Co., Ltd.) and PET chips (having a intrinsic viscosity of 0.64 dl/gr, manufactured by Shinkong Synthetic Fibers Corporation) are used as raw materials in composite spinning for 16 segmented composite spinning, in which the melting temperature of the TPEE is set to 275° C., the melting temperature of the PET is set to 280° C., and the composite weight ratio of TPEE/PET is 30/70. The obtained composite fiber is drawn by a drawing machine at a rate of 5000 m/min, and the drawn composite fiber has the following physical properties: fineness: 3.5 denier, fiber strength: 4.5 g/den, and elongation: 55%. After being drawn by the drawing machine, the composite fiber is spread into a fiber web with uniform mass distribution. The fiber web is stacked for six layers, and sequentially cogged and finished to achieve physical entanglement, thereby forming a non-woven fabric. The non-woven fabric has a weight per unit area of 330 g/m². The non-woven fabric is then hot-pressed at 190° C. to smooth down the surface of the fabric, and the TPEE is melted and softened at the same time. During the hot-pressing and cooling process, because the segmented structure of the composite fiber which will be fine-cut and adhesion at some parts is generated between the fibers, so as to obtain an artificial leather substrate.

EXAMPLE 6

The artificial leather substrate obtained in Example 1 is impregnated in an elastic polyurethane solution having a solid content of 30%, and then extruded to remove the excessive elastic polyurethane solution, so as to make the elastic polyurethane solution uniformly distributed on the substrate. Next, the elastic polyurethane solution is applied on the substrate to form an intermediate layer, the substrate is placed in water to remove the solvent dimethylformamide, and the polyurethane is solidified into a porous intermediate layer (elastic film). After that, the substrate is rinsed to clean the solvent and then dried to obtain the artificial leather having excellent physical properties and the textile feeling of superfine fibers.

COMPARATIVE EXAMPLE 2

Similar to the process in Example 6, the artificial leather substrate obtained in Comparative Example 1 is impregnated in an elastic polyurethane solution having a solid content of 30%, and then extruded to remove the excessive elastic polyurethane solution, so as to make the elastic polyurethane solution uniformly distributed on the substrate. Next, the elastic polyurethane solution is applied on the substrate to form an intermediate layer, the substrate is placed in water to remove the solvent dimethylformamide, and the polyurethane is solidified into a porous intermediate layer (elastic film). After that, the substrate is rinsed to clean the solvent and then dried to obtain an artificial leather.

Table 2 shows a comparison of the physical properties of the artificial leather of Comparative Example 2 (100% polyester staple fiber) and the artificial leather of Example 6 (30% SEBS composite staple fiber+70% polyester staple fiber). As shown in Table 2, the performance of the artificial leather having the SEBS/PBT composite staple fiber is significantly enhanced in terms of tear strength, tensile strength, peeling strength, and rupture strength, and the artificial leather achieves the delicate textile feeling of superfine fibers.

TABLE 2

Comparison of the physical properties of the artificial leather of Comparative Example 2 (100% polyester staple fiber) and the artificial leather of Example 6 (30% SEBS composite staple fiber + 70% polyester staple fiber), in which MD represents mechanical direction and CD represents cross direction.

| Fiber composition of artificial leather | | Tear (kg/cm) | Tensile strength 2.54 cm) | Elongation (%) | Peeling strength (kg) | Rupture strength (kg/cm²) |
|---|---|---|---|---|---|---|
| 100% polyester staple fiber | MD | 10 | 42 | 100 | 3.5 | 23 |
| | CD | 9 | 32 | 120 | | |
| 30% SEBS composite staple fiber + 70% polyester staple fiber | MD | 12 | 48 | 70 | 4.8 | 25 |
| | CD | 10 | 46 | 90 | | |

EXAMPLE 7

The artificial leather substrate obtained in Example 1 is impregnated in an elastic polyurethane solution having a solid content of 22%, and then extruded to remove the excessive elastic polyurethane solution, so as to make the elastic polyurethane solution uniformly distributed on the substrate. Next, the substrate is placed in a dimethylformamide aqueous solution for pre-solidification, and then extruded to remove the excessive dimethylformamide aqueous solution. Afterwards, the elastic polyurethane solution is applied on the substrate to form an intermediate layer, the substrate is placed in water to remove the solvent dimethylformamide, and the polyurethane is solidified into a porous intermediate layer (elastic film). After that, the substrate is rinsed to clean the solvent and then dried to obtain an artificial leather having excellent physical properties and the textile feeling of superfine fibers.

EXAMPLE 8

The artificial leather substrate obtained in Examples 1 to 5 is impregnated in an elastic polyurethane aqueous solution having a solid content of 30%, and then extruded to remove the excessive elastic polyurethane aqueous solution, so as to make the elastic polyurethane aqueous solution uniformly distributed on the substrate. Next, the substrate is pre-solidified, and the elastic polyurethane aqueous solution is applied on the substrate to form an intermediate layer. After that, the substrate is rinsed to clean the solvent and then dried to obtain half-finished artificial leather having excellent physical properties and the textile feeling of superfine fibers.

Subsequently, the elastic polyurethane solution is applied on a release paper, and the paper is dried to make the solvent volatilize, so that the elastic polyurethane is cured into a thin film. At this time, the solidified elastopolymer forms an elastic film. An adhesive is then applied on the surface of the elastic polyurethane thin film, the half-finished artificial leather is laminated on the thin film, and the leather substrate is dried to make the adhesive layer completely reacted. Finally, the release paper is peeled off, and an artificial leather having excellent physical properties and the textile feeling of superfine fibers is obtained.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined by the appended claims.

What is claimed is:

1. A method for making an artificial leather substrate, comprising:
   (a) providing a plurality of composite fibers, wherein each of the composite fibers comprises a first composition and a second composition, the first composition is thermoplastic non-elastomer, the second composition is thermoplastic elastomer (TPE), and the second composition is in an amount of 5 to 70 weight % of the composite fiber, the first composition and the second composition are alternately distributed in a circumference of a cross-section of each of the composite fibers, and the length of the second composition is less than 50% of the total length of the circumference;
   (b) forming a plurality of fiber webs, wherein the fiber webs contain the composite fibers;
   (c) stacking the fiber webs;
   (d) performing needle punching or water punching on the fiber webs;
   (e) softening the second composition to bond the composite fibers; and
   (f) curing the second composition, so that cross-points between the composite fibers are elastic bonding points formed by the second composition.

2. The method according to claim 1, wherein the material of the first composition is selected from the group consisting of polyester polymers, polyamide polymers, and polyolefin polymers, and the material of the second composition is selected from the group consisting of thermoplastic styrenic block copolymer elastomer, thermoplastic polyester elastomer (TPEE), thermoplastic olefin (TPO), thermoplastic vulcanizate (TPV), and thermoplastic polyamide (TPA).

3. The method according to claim 1, wherein in Step (b), the fiber webs are formed by spunbonding, melt blowing, carding, wet laying, or air laying.

4. The method according to claim 1, wherein in Step (e), the second composition is softened by heating or through solution impregnation, and in Step (f), the second composition is cured by removing the heat or the solution.

* * * * *